(12) United States Patent
Comaniciu et al.

(10) Patent No.: US 7,248,718 B2
(45) Date of Patent: Jul. 24, 2007

(54) SYSTEM AND METHOD FOR DETECTING A PASSING VEHICLE FROM DYNAMIC BACKGROUND USING ROBUST INFORMATION FUSION

(75) Inventors: Dorin Comaniciu, Princeton Junction, NJ (US); Ying Zhu, Monmouth Junction, NJ (US); Martin Pellkofer, Pentling (DE); Thorsten Köhler, Deuerling (DE)

(73) Assignee: Siemens Corporate Research, Inc., Princeton, NJ (US)

( * ) Notice: Subject to any disclaimer, the term of this patent is extended or adjusted under 35 U.S.C. 154(b) by 290 days.

(21) Appl. No.: 11/054,996

(22) Filed: Feb. 10, 2005

(65) Prior Publication Data

US 2005/0196020 A1 Sep. 8, 2005

Related U.S. Application Data

(60) Provisional application No. 60/545,781, filed on Feb. 19, 2004.

(51) Int. Cl.
*G06K 9/80* (2006.01)
(52) U.S. Cl. ...................................... 382/104; 340/937
(58) Field of Classification Search .................... None
See application file for complete search history.

(56) References Cited

U.S. PATENT DOCUMENTS 5,036,474 A * 7/1991 Bhanu et al. ............... 348/117
5,365,603 A * 11/1994 Karmann .................... 382/291
6,356,206 B1 * 3/2002 Takenaga et al. ........... 340/903

OTHER PUBLICATIONS

B. K. Horn and B. G. Schunk. "Determining Optical Flow", 1981, IEEE, Artificial Intelligence 17 No. 1-3, 185-204.*
Tistarelli M et al, "Application of Optical Flow for Automated Overtaking Control", *Applications of Computer Vision 1994*, Proceedings of the Second IEEE Workshop on Sarasota, FL, US, Dec. 5-7, 1994; Los Alamitos, CA, US, Dec. 5, 1994; pp. 105-112.
Takumi E et al, "Detection of Moving Objects Using Observer Motion Based Optical Flow Estimation", *Systems and Computers in Japan*, vol. 33, No. 6, Jun. 2002, pp. 83-92.
Comaniciu D, "Nonparametric Information Fusion for Motion Estimation", *Proceedings 2003 IEEE Conference on Computer Vision and Pattern Recognition*, CVPR 2003, Madison, WI, Jun. 18-20, 2003, Los Alamitos, CA, vol. 2 of 2, Jun. 18, 2003; pp. 59-66.
Zhu Y et al, "Passing Vehicle Detection from Dynamic Background Using Robust Information Fusion", *Proceedings 2004 IEEE Intelligent Transportation Systems Conference*, Oct. 3-6, 2004, pp. 564-569.

(Continued)

*Primary Examiner*—Brian Werner
*Assistant Examiner*—Thomas M Redding
(74) *Attorney, Agent, or Firm*—Michele L. Conover (57) ABSTRACT

A system and method for detecting a passing vehicle is disclosed. A video sequence comprising a plurality of image frames is received. Image intensity is measured and image motion is estimated in each image frame. A hypothesis model describing background dynamics is formulated. The measured image intensity and motion estimation is used to determine if the background dynamics has been violated in a given image frame. If the background dynamics has been violated, motion coherency is used to determine whether the violation of the background dynamics is caused by a passing vehicle.

24 Claims, 7 Drawing Sheets

OTHER PUBLICATIONS

Search Report (including Notification of Transmittal of the International Search Report, International Search Report, and Written Opinion of the International Searching Authority).

Comaniciu, "Nonparametric information fusion for motion estimation", IEEE Int'l Conf. on Computer Vision and Pattern Recognition, pp. 59-66, 2003.

Marquardt, "Generalized inverse, ridge regression, biased linear estimation, and nonlinear estimation", Technometrics, 12(3), pp. 591-612, 1970.

Comaniciu et al., "Real-time tracking of non-rigid objects using mean shift", IEEE Int'l Conf. Computer Vision and Pattern Recognition, pp. 142-149, 2000.

Enkelmann, "Obstacle detection by evaluation of optical flow fields from image sequences", Image and Vision Computing, 9(3), pp. 160-168, 1991.

Nelson et al., "Obstacle avoidance using flow field divergence", IEEE Trans. Pattern Analysis and Machine Intelligence, 11(10), pp. 1102-1106, 1989.

Kruger, "Robust real-time ground plane motion compensation from a moving vehicle", Machine Vision and Applications, 11, pp. 203-212, 1999.

Enkelmann, "Video-based driver assistance-from basic function to applications", Int. J. Computer Vision, 45(3), pp. 201-221, 2001.

Carlsson et al., "Object detection using model based prediction and motion parallax", European Conference on Computer Vision, pp. 297-306, 1990.

Betke et al., "Real-time multiple vehicle detection and tracking from a moving vehicle", Machine Vision and Applications, 12, pp. 69-83, 2000.

Haag et al., "Combination of edge element and optical flow estimates for 3D-model based vehicle tracking in traffic image sequences", Int. J. Computer Vision, 35(3), pp. 295-319, 1999.

Handmann et al., "Computer vision for driver assistance systems", Proc. SPIE, 3364, pp. 136-147, 1998.

Batavia et al., "Overtaking vehicle detection using implicit optical flow", Proc. IEEE Transportation Systems Conf., pp. 729-734, 1997.

* cited by examiner

SYSTEM AND METHOD FOR DETECTING A PASSING VEHICLE FROM DYNAMIC BACKGROUND USING ROBUST INFORMATION FUSION

CROSS REFERENCE TO RELATED APPLICATION

This application claims the benefit of U.S. Provisional Application Ser. No. 60/545,781, filed on Feb. 19, 2004, which is incorporated by reference in its entirety.

FIELD OF THE INVENTION

The present invention is directed to a system and method for detecting a passing vehicle, and more particularly, to a system and method for detecting a passing vehicle from dynamic background using robust information fusion.

BACKGROUND OF THE INVENTION

Machine-vision-based obstacle detection and tracking is an important component in autonomous vehicle systems. In a typical driving scene, the obstacles include vehicles, pedestrians and any other objects that are either moving or rising above the road plane. The purpose of obstacle detection is to separate moving objects from the driving scene, the obstacles including vehicles, pedestrians and any other objects that are either moving or rising above the road plane. Such information is required by a number of automotive applications, e.g., adaptive cruise control, forward collision avoidance and lane departure warning. By fusing the results of detecting and tracking individual objects, it is possible to achieve sufficient perception of the driving environment.

In a monocular vision system designed for driver assistance, a single camera is mounted inside the ego-vehicle to capture image sequence of forward road scenes. Various vehicle detection methods have been developed to detect vehicles in the central field of the view. Such methods can be used in passing vehicle detection. In passing vehicle detection, vehicles that are passing the ego-vehicle upon the left or right and entering the field of view at a higher speed are detected. Passing vehicle detection plays a substantial role in understanding the driving environment. Because of the potentially unsafe driving situation that an overtaking vehicle could create, it is important to monitor and detect vehicles passing by.

Since passing vehicles need to be detected earlier on while they are entering the view and only partially visible, appearance information cannot be completely relied upon. Instead, characteristic optical flows are generated by a vehicle passing by. Hence, motion information becomes an important cue in detecting passing vehicles. Several known obstacle detection methods using optical flow have been used to detect passing vehicles. In these methods, a predicted flow field calculated from camera parameters and vehicle velocity is compared with the actual image flows calculated from motion estimation. An obstacle is declared if the actual flows do not match the predicted flows. These methods work well if neither strong noise nor illumination change is present. However, in practical situations, structured noise and strong illumination are quite common which cause spurious image features and unreliable flow estimates. There is a need for a method for detecting passing vehicles which is capable of robust motion estimation.

SUMMARY OF THE INVENTION

The present invention is directed to a system and method for detecting a passing vehicle. A video sequence comprising a plurality of image frames is received. Image intensity is measured and image motion is estimated in each image frame. A hypothesis model describing background dynamics is formulated. The measured image intensity and motion estimation is used to determine if the background dynamics has been violated in a given image frame. If the background dynamics has been violated, motion coherency is used to determine whether the violation of the background dynamics is caused by a passing vehicle.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

Figure 1:
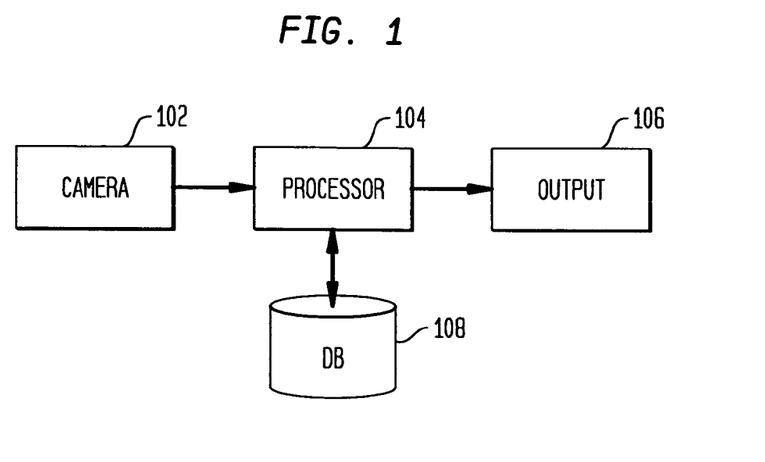
FIG. 1 is a system block diagram of a system for detecting passing vehicles in accordance with the present invention.

The present invention is directed to a system and method for detecting passing vehicles from dynamic background. FIG. 1 illustrates a block diagram of a system for implementing the present invention. A camera 102 is used to capture images of a road and its surroundings. As would be expected with a typical road image, the image includes background images, such as buildings, trees, and houses, and vehicles driving on the road. The images are communicated to a processor 104 which analyzes the image intensity and image motion to detect any change in scene dynamics. If a change is detected, in accordance with the present invention, hypothesis testing is performed to determine if the scene change is due to a passing vehicle.

In addition, a coherency test is performed to substantiate that the scene change is due to a passing vehicle and not some other condition such as noise, illumination changes or other background movement. Once a passing vehicle is identified at a sufficient confidence level, the vehicle is identified via an output device 106. The output device 106 provides an output signal which communicates to the user the presence of the passing vehicle. The output signal may be an audible signal or other type of warning signal. The output device 106 may also include a display for viewing the detected vehicles. The display provides a view of the images taken by the camera 102 which are then enhanced to indicate vehicles that have been detected and which are being tracked. These images can be stored in database 108.

Figure 2:
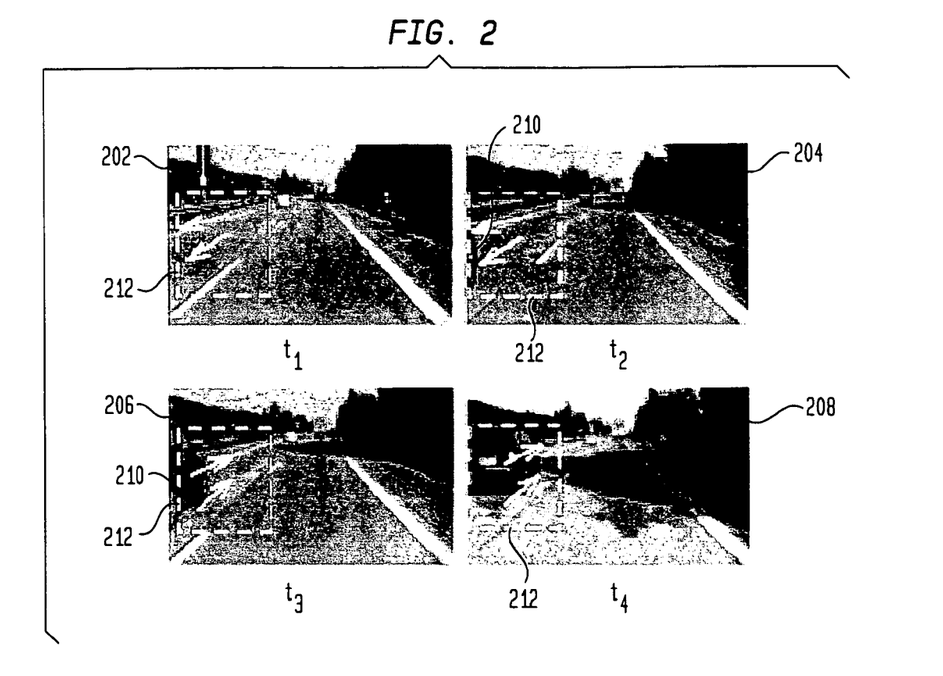
FIG. 2 illustrates a sequence of image frames that show a passing vehicle in accordance with the present invention.

The present invention is directed to detecting events of a vehicle entering and triggering warning in real time. In particular, a robust motion estimation scheme using variable bandwidth density fusion is used to detect passing vehicles as will be described in further detail hereinafter. Vehicle passing is a sporadic event that changes the scene configuration from time to time. FIG. 2 illustrates a sequence of image frames 202-208 that are captured in sequential instances in time. When a vehicle 210 enters the field of view between times $t_2 \sim t_3$, the vehicle forms a local foreground layer that temporarily blocks the road scene. Both image appearance and image motion around the entry point which is located in sub-window 212 deviate from road scene dynamics. In detecting passing vehicles, one aspect is detecting changes in the scene dynamics around defined entry points.

Figure 3:
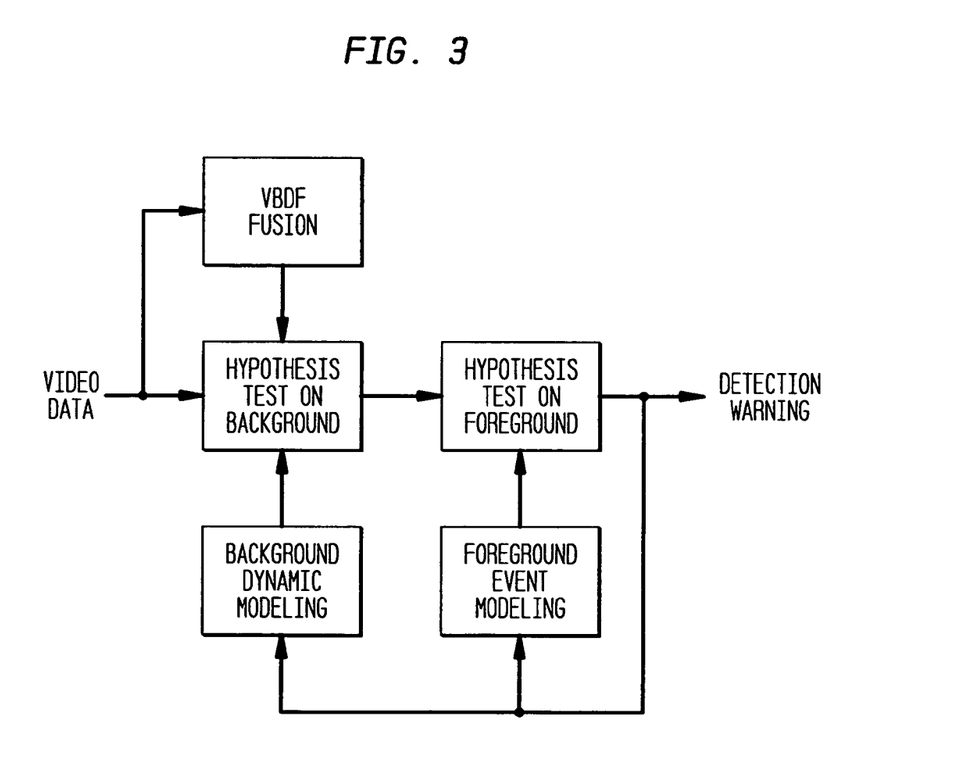
FIG. 3 is a flow block diagram that outlines the method for detecting passing vehicles in accordance with the present invention.

In accordance with the present invention, three issues are addressed in order to detect a passing vehicle: modeling the dynamics of the road scene and vehicle passing, deriving a decision rule for passing vehicle detection and estimating relevant features and statistical quantities involved in hypothesis testing. A high level flow diagram of the method is illustrated in FIG. 3. The dynamics of the road scenes and the passing vehicles are characterized by modeling image intensity and image motion around the entry points. For the event of vehicle passing, a temporal coherency in vehicle movement is imposed. The image intensity and image motion inside analysis windows placed at the entry points is monitored. Any changes of scene dynamics in the analysis windows are detected. Relevant parameters used in hypothesis testing are updated over time in response to detection results.

In the absence of passing vehicles, the visible road scene, i.e., the background, is moving consistently in the field of view as the camera is moving along with the ego-vehicle. Given the vehicle velocity and camera calibration, the image motion and image intensity of the background scene is predictable over time. In other words, the background scene follows a dynamic model defined by camera parameters and camera motion. Denote the image intensity at time instance t by $I(x, t)$ and the motion vector $v(x,t)$, where x is the spatial coordinate of an image pixel. The hypothesis of the dynamic background is described as follows:

Hroad:

$$I(x+v(x,t)\cdot \delta t, t-\delta t)=I(x,t)+n_I$$

$$v(x,t)=h(x,V_0(t),\theta) \quad (1)$$

The true image motion $v(x, t)$ is decided by the vehicle speed $V_0(t)$ and camera parameters $\theta$. Under the brightness constancy condition, image intensity is predictable from previous frames given the true motion. Nevertheless, brightness constancy is frequently violated in practice due to changing illumination. In addition, intensity is also affected by various image noise. Therefore, a noise term $n_I$ is adopted to account for the perturbation on intensity. These hypotheses on scene dynamics improve useful domain-specific constraints.

When a passing vehicle enters the view, the dynamics of the background scene is violated. From equation (1), violations of background dynamics can be detected through hypothesis testing on image intensity and image motion. However, a violation can happen under conditions other than vehicle passing, such as strong illumination changes and structured noise. To validate that a violation is indeed caused by a passing vehicle, it is necessary to exploit the domain-specific constraints introduced by passing vehicles as well.

Figure 4:
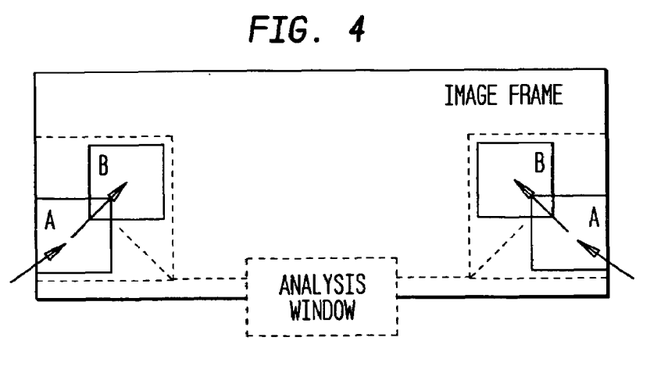
FIG. 4 illustrates an exemplary image frame and two sub-windows in the image frame showing the motion coherency of a passing vehicle in accordance with the present invention.

Considering the diversity of vehicle appearance and velocity, the dynamics of passing vehicles are characterized by underlining the coherency present in vehicle motion. As illustrated in FIG. 4, to describe motion coherency, the motion pattern of a passing vehicle is studied through two sub-windows A and B that are along the trajectory that a passing vehicle would travel. As a passing vehicle enters the field of view, it arrives at A and B in an orderly fashion. For a vehicle to arrive at B, it has to arrive at A first. Thus violation of background dynamics should happen in sub-window A prior to occurring in sub-window B.

Figure 5:
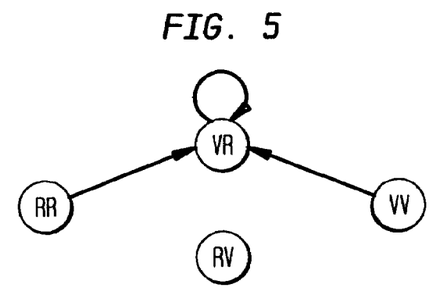
FIG. 5 illustrates the admissible paths of state transitions in accordance with the present invention.

In contrast, such coherency is lacking in the case where the violation of scene or background dynamics is a consequence of irregular causes such as sudden illumination changes, structured noise and shadows. Therefore, the hypothesis made on passing vehicles helps to further distinguish events with coherent motion from irregular causes, also referred to as outliers. Referring now to FIG. 5, $S_A$ and $S_B$ are denoted as the state variable of sub-windows A and B respectively. R represents the state where motion and intensity comply with road dynamics, and V represents the state where the road dynamics are violated.

The event of a vehicle passing is described as a series of state transitions of $S_A S_B$ starting with RR and ending with VV. As shown in FIG. 5, coherent events are distinguished by a set of admissible paths of state transitions $$H_{vehicle}: \rho=\{RR \to VR \to \ldots \to VV\}. \quad (2)$$

Figure 6:
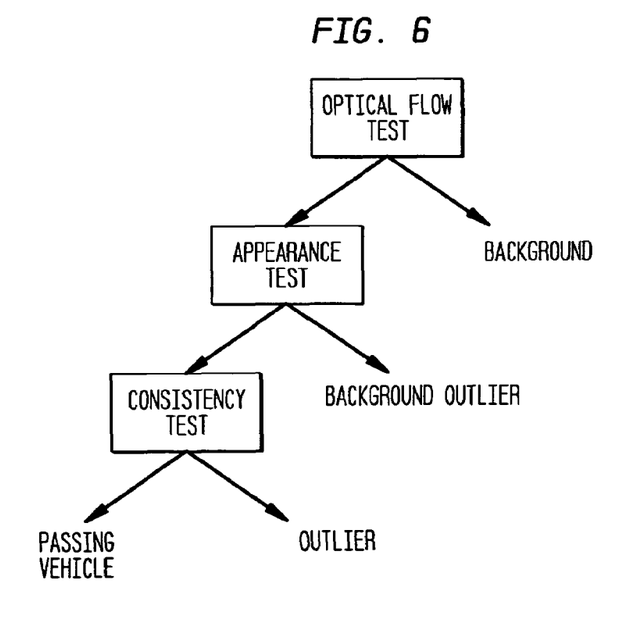
FIG. 6 illustrates a decision tree used to detect a passing vehicle in accordance with the present invention.

In dealing with passing vehicle detection, different contexts are encountered in the analysis window, e.g., road scenes, outliers and vehicles. Decision trees classify these contexts by sorting through a series of hypothesis testing represented in a tree form. FIG. 6 illustrates an exemplary decision tree that can be used to detect passing vehicles in accordance with the present invention. Image motion and image intensity are tested against the dynamic model of the road scene. A coherency test is performed on the contexts that violate the scene dynamics. The decision rule for passing vehicles is summarized as follows:

$$\text{(background dynamics is violated)}\hat{}\text{(coherency is satisfied)} \quad (3)$$

The true motion $v(x, t)$ of the road scene is given in equation (1). If the observed image motion is estimated, then the hypothesis testing on background dynamics is expressed as follows:

Violation of background dynamics if $$(\|\hat{v}(x, t)-v(x, t)\| \geq \tau_{motion}) \vee (\|R(x, t)\| \geq \tau_{residual}) \quad (4)$$

where $R(x, t)=I(x+v(x, t)\cdot \delta t, t-\delta t)-I(x, t)$ is the residual from motion compensation and reflects the mismatch between the predicted image and the actual image. By testing motion and residual, all the instances are classified into two groups; instances complying with background dynamics and instances violating background dynamics.

Although further testing is performed to classify instances of violations, it is important to have reliable motion estimation $\hat{v}(x,t)$ that faithfully reflects the context for an accurate initial classification. The present invention employs a robust motion estimation algorithm using Variable Bandwidth Density Fusion (VBDF) and spatial-temporal filtering.

When motion estimation is not reliable, the residual test helps to identify background scenes. In some instances, the presence of background can not be identified by motion but can be easily identified by testing the image residual. The thresholds $\tau_{motion}$, $\tau_{residual}$ as well as the admissible state transitions $\rho$ are part of the decision tree solution. There are generally two ways to solve them, offline learning and online learning. Online decision tree learning enables system adaptation to the gradual change of scene dynamics. Take $\tau_{residual}$ as an example, online learning can be achieved by modeling the residual data $\{R(x, T), R(x, T-1), R(x, T-2), \ldots\}$ computed online. Nonparametric density estimation and mode finding techniques can be used to cluster the data, obtain a Gaussian mixture model and update the model over time. The mixture model learned online is then used to predict the context from new observations $R(x, T+1)$.

The coherency test is performed on instances where background dynamics is violated. The purpose of this test is to further rule out outliers caused by structured noise and sudden illumination changes. From the hypothesis formulated on passing vehicles in Equation (2), the decision rule is expresses as:

$$\text{passing vehicle:} \quad (5)$$
$$\{\cdots S_A(t-2)S_B(t-2), S_A(t-1)S_B(t-1), S_A(t)S_B(t)\} \in P$$

$$\text{outlier:}$$
$$\{\cdots S_A(t-2)S_B(t-2), S_A(t-1)S_B(t-1), S_A(t)S_B(t)\} \notin P$$

As described above, the present invention uses a robust motion estimation algorithm to determine whether the background dynamics are violated. If brightness constancy is assumed, the motion vector for a given image location is computed by solving the linear equation $$\nabla_x I(x, t) \cdot v = -\nabla_t I(x, t) \quad (6)$$

The biased least squares solution is as follows:

$$\hat{v} = (A^T A + \beta I)^{-1} A^T b \quad (7)$$

where A is a matrix defined by the spatial image gradients $\nabla_x I$ in a local region, and b is a vector comprised of temporal image gradients $\nabla_t I$. To describe the uncertainty of the motion estimation, its covariance is defined as:

$$C = \hat{\sigma}^2 (A^T A + \beta I)^{-1} \quad (8)$$

$$\hat{\sigma}^2 = \frac{1}{N-3} \sum_{i=1}^{N} (\nabla_x I(x_i, t) \cdot \hat{v} + \nabla_t I(x_i, t))^2.$$

where N is the number of pixels in the local region and $\hat{\sigma}^2$ is the estimated variance of image noise. Unreliable flow estimates are associated with covariance matrices with a large trace. This information is important for robust fusion.

A multiscale hierarchical framework of computing $\hat{v}$ and its covariance C is described in D. Comaniciu, "Nonparametric information fusion for motion estimation", CVPR 2003, Vol. 1, pp. 59-66 which is incorporated by reference. For every image frame, the initial motion vector is estimated at different spatial locations inside the analysis window. As a result, a sequence of motion estimates with covariances $\{v_{x,t}, C_{x,t}\}$ in space and in time are obtained.

The initial motion estimates are sensitive to structured noise and illumination changes which introduce outliers in motion estimates. To overcome these outliers, joint spatial-temporal filtering is performed on the initial motion estimates through a technique called Variable Bandwidth Density Fusion (VBDF). VBDF is a fusion technique that is able to locate the most significant mode of the data and this is robust against outliers. Given the initial motion estimates $v_{x,t}$ and covariance $C_{x,t}$ across multiple spatial and temporal locations $x=\{x_1, \ldots, x_n\}$, $t=\{T, T-1, \ldots, T-M\}$, VBDF is applied to obtain the dominant motion in the analysis window of the T-th frame.

VBDF is implemented through the following mean shift procedure. First a pointwise density estimator is defined by a mixture function:

$$f(v; \{v_{x,t}, C_{x,t}\}) = \sum_{x,t} a_{x,t} K(v; v_{x,t}, C_{x,t}) \quad (9)$$

$$K(v; v_i, C_i) = \frac{\exp\left(-\frac{1}{2}(v-v_i)^T C_i^{-1}(v-v_i)\right)}{(2\pi)^{d/2} |C_i|^{1/2}}$$

$$\sum_{x,t} a_{x,t} = 1$$

Here $a_{x,t}$ defines a weighting scheme on the data set, and $K(v; v_i, C_i)$ is the Gaussian kernel with center $v_i$ and bandwidth $C_i$. The variable bandwidth mean shift vector at location v is given by:

$$m(v) = H(v) \sum_{x,t} w_{x,t} C_{x,t}^{-1} v_{x,t} - v \quad (10)$$

$$H(v) = \left(\sum_{x,t} w_{x,t} C_{x,t}\right)^{-1}$$

$$w_{x,t}(v) = \frac{\frac{a_{x,t}}{|C_{x,t}|^{1/2}} \exp\left(-\frac{1}{2}(v-v_{x,t})^T C_{x,t}^{-1}(v-v_{x,t})\right)}{\sum_{x,t} \frac{a_{x,t}}{|C_{x,t}|^{1/2}} \exp\left(-\frac{1}{2}(v-v_{x,t})^T C_{x,t}^{-1}(v-v_{x,t})\right)}$$

The iterative computation of the mean shift vector recovers a trajectory starting from v and converging to a local maximum, i.e., a mode of the density estimate $f(v; \{v_{x,t}\})$.

$$v_0 = v$$

$$v_{j+1} = v_j + m(v_j) (j \geq 0)$$

$$v_j \to \text{mode}(v; \{v_{x,t}, C_{x,t}\}) \text{ as } j \to \infty \quad (11)$$

To treat $f(v; \{v_{x,t}, C_{x,t}\})$ with multiple modes, a series of analysis bandwidths $C_{x,t}^l = C_{x,t} + \alpha_l I$ ($\alpha_0 > \alpha_1 > \ldots > 0$) which leads to multiple smoothed density estimates $f(v; \{v_{x,t}, C_{x,t}^l\})$. The number of modes in the density estimate decreases as larger analysis bandwidths is adopted. At the initial scale, $\alpha_0$ is set large such that the density $f(v; \{v_{x,t}, C_{x,t}^0\})$ has only one mode $\text{mode}_0 = \text{mode}(v; \{v_{x,t}, C_{x,t}^0\})$ which is invariant to the starting point v in VBDF. The mode point is then propagated across scales. At each scale, VBDF uses the mode point found from the last scale as the initial point to locate the mode for the current scale.

$$\text{mode}_l = \text{mode}(\text{mode}_{l-1}; \{v_{x,t}, C_{x,t}^l\}) (l=1, 2, \ldots) \quad (12)$$

Figure 7:
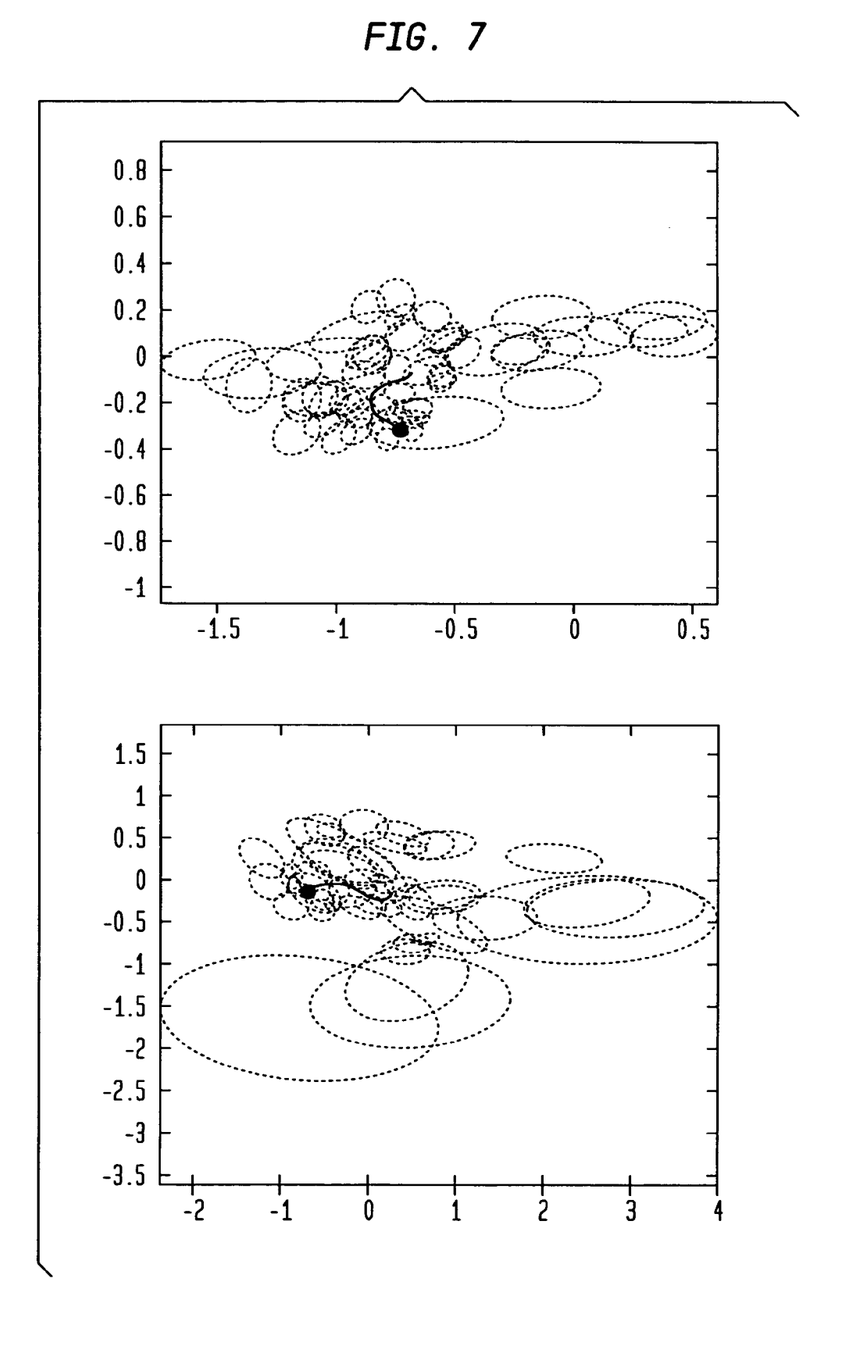
FIG. 7 illustrates two examples of using variable bandwidth density fusion to determine inside an analysis window in accordance with the present invention.

The mode point will converge to the most significant sample estimate as $\alpha_j$ decreases. The convergent point defines the dominant motion $\hat{v}_t$ inside the analysis window of frame T. FIG. 7 shows two examples of using VBDF to obtain the dominant motion inside the analysis window. For every frame, initial motion estimates are computed at 9 equally spaced locations in the analysis window. The initial estimates from 5 consecutive frames are used as the input to VBDF. Exponential forgetting is employed to weight these initial motion estimates temporally. The results shown in FIG. 7 demonstrate the robustness of the fusion algorithm against outliers.

Figure 8:
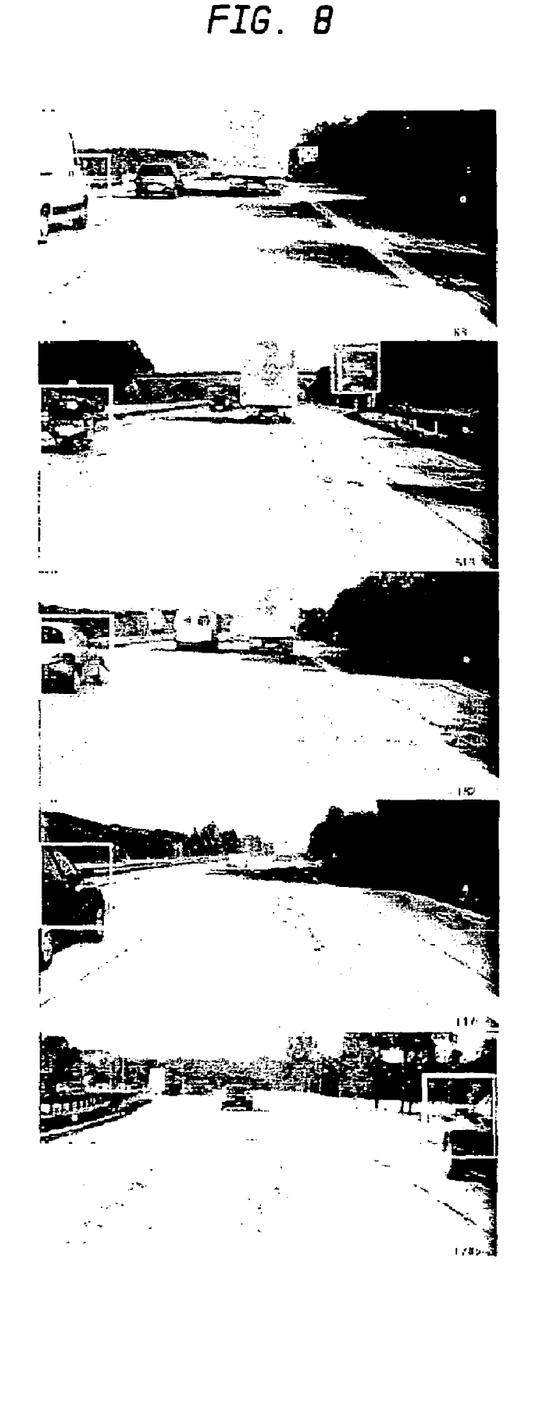
FIG. 8 illustrates detections of passing vehicles in accordance with the present invention.
Figure 9:
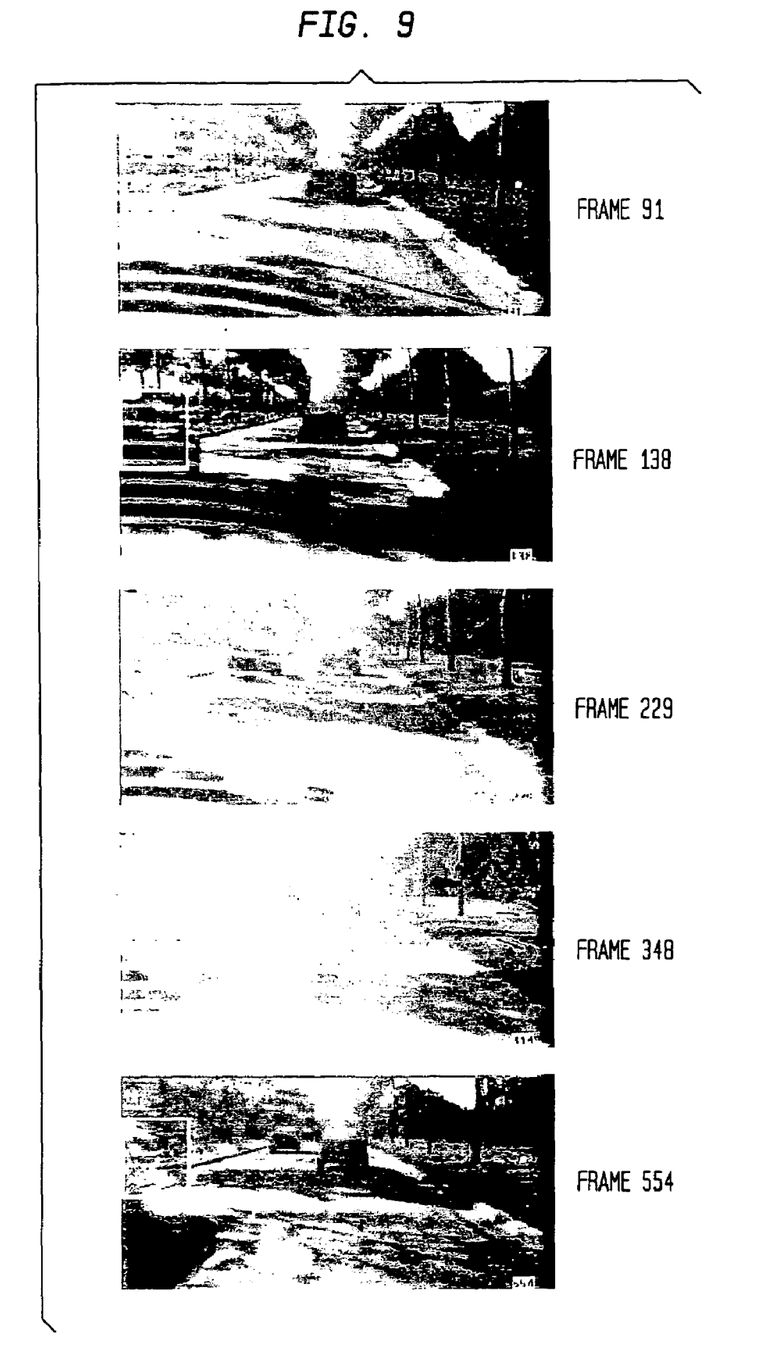
FIG. 9 illustrates detection of passing vehicles that are subject to extreme illumination variations in accordance with the present invention.
Figure 10:
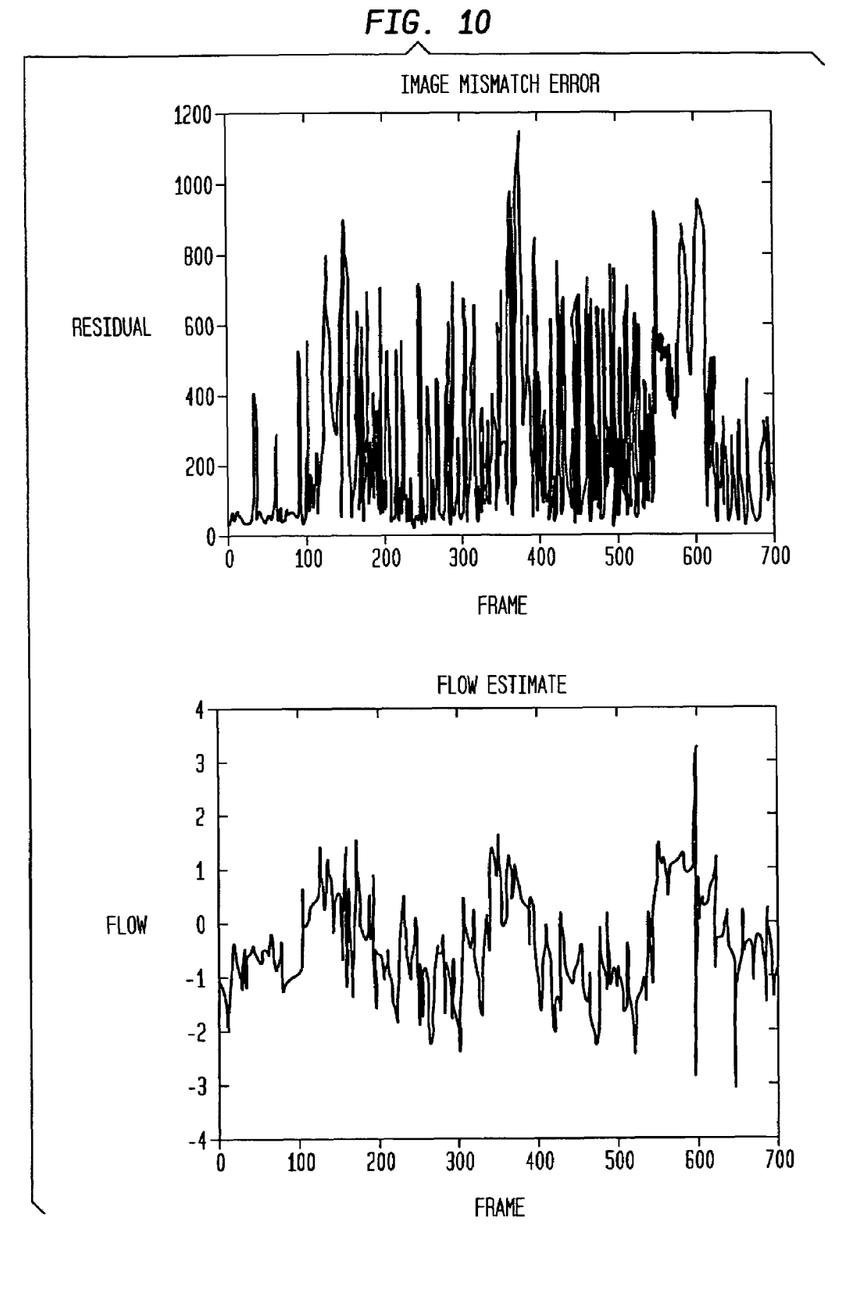
FIG. 10 illustrates graphs depicting the image mismatch error and flow estimate data associated with the image frames shown in FIG. 9.

FIG. 8 illustrates examples of images frames in which passing vehicles have been detected. Each example illustrates the detection results and the estimated motion vectors. As can be seen, vehicles of various shapes were detected regardless of visible illumination changes, shadows and structured noise. FIGS. 9 and 10 show image frames representing detection results of a video heavily contaminated by noise caused by glares on the windshield of the ego-vehicle. The structured noise causes large mismatch of the actual flow and image from their predictions.

Having described embodiments for a method for detecting passing vehicles, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method of detecting a passing vehicle comprising the steps of:
    receiving a video sequence comprised of a plurality of image frames;
    measuring image intensity and estimating image motion in each image frame;
    formulating a hypothesis model describing background dynamics;
    using the measured image intensity and motion estimation to determine if the background dynamics has been violated in a given image frame by determining if the difference between the measured image intensity and a predicted image intensity is above a threshold and if the difference between the measured image motion and a predicted image motion of the background is above a threshold; and
    if the background dynamics has been violated, using motion coherency to determine whether the violation of the background dynamics is caused by a passing vehicle by performing the following steps:
        applying a first subwindow and a second subwindow to the image frame having the violated background dynamics to determine the sequence of motion causing the violation, the motion between the first and second subwindows being measured using robust motion estimation which calculates image flow and their covariances at distributed sample points in an analysis window with multiple image frames;
        determining the trajectory of motion of the violated background dynamics by determining which subwindow first indicates a change in image motion; and
        if the first subwindow experiences a change in image motion first, determining the violation of background dynamics to be caused by a passing vehicle.

2. The method of claim 1 wherein the hypothesis model describing background dynamics comprises hypothesis on image intensity and hypothesis on image motion.

3. The method of claim 1 wherein the predicted image intensity is determined by the hypothesis model describing background dynamics.

4. The method of claim 1 wherein the predicted image motion of the background is determined by ego-motion and camera parameters.

5. The method of claim 1 wherein the measured image motion is obtained through a robust motion estimation method.

6. The method of claim 1 further comprising the steps of:
    determining if the measured motion associated with the violated background dynamics has motion coherency; and
    if there is motion coherency, determining that the violation is due to a passing vehicle.

7. The method of claim 1 wherein robust motion estimation is done by exponentially weighting image flows and their covariances at distributed sample points.

8. The method of claim 1 wherein the robust motion estimation is done through joint spatial temporal filtering on image flows at distributed sample points.

9. The method of claim 8 wherein the spatial temporal filtering is done using variable density bandwidth fusion and multiscale mean shift.

10. The method of claim 9 wherein the measured motion in the first and second analysis windows are determined by the most significant sample estimate obtained by variable density bandwidth fusion and multiscale mean shift.

11. The method of claim 1 wherein the video sequence is received from a camera mounted to an ego vehicle.

12. The method of claim 1 wherein trajectory of motion is determined using vehicle speed of the ego vehicle and camera parameters.

13. A system for detecting a passing vehicle comprising:
    at least one camera for capturing a video sequence of image frames of background dynamics;
    a processor associated with the at least one camera, the processor performing the following steps:
    i). measuring image intensity and estimating image motion in each image frame;
    ii). formulating a hypothesis model describing the background dynamics;
    iii). using the measured image intensity and motion estimation to determine if the background dynamics has been violated in a given image frame by determining if the difference between the measured image intensity and a predicted image intensity is above a threshold and if the difference between the measured image motion and a predicted image motion of the background is above a threshold; and
    iv). if the background dynamics has been violated, using motion coherency to determine whether the violation of the background dynamics is caused by a passing vehicle by performing the following steps:
        a). applying a first subwindow and a second subwindow to the image frame having the violated background dynamics to determine the sequence of motion causing the violation, the motion between the first and second subwindows being measured using robust motion estimation which calculates image flows and their covariances at distributed sample points in an analysis window with multiple image frames;
        b). determining the trajectory of motion of the violated background dynamics by determining which subwindow first indicates a change in image motion; and c). if the first subwindow experiences a change in image motion first, determining the violation of background dynamics to be caused by a passing vehicle.

14. The system of claim 13 wherein the hypothesis model describing background dynamics comprises hypothesis on image intensity and hypothesis on image motion.

15. The system of claim 13 wherein the predicted image intensity is determined by the hypothesis model describing background dynamics.

16. The system of claim 13 wherein the predicted image motion is determined by ego-motion and camera parameters.

17. The system of claim 13 wherein the measured image motion is obtained through a robust motion estimation method.

18. The system of claim 13 wherein the processor further performs the steps of:
   determining if the measured motion associated with the violated background dynamics has motion coherency; and
   if there is motion coherency, determining that the violation is due to a passing vehicle.

19. The system of claim 13 wherein robust motion estimation is done by exponentially weighting image flows and their covariances at distributed sample points.

20. The system of claim 13 wherein the robust motion estimation is done through joint spatial temporal filtering on image flows at distributed sample points.

21. The system of claim 20 wherein the spatial temporal filtering is done using variable density bandwidth fusion and multiscale mean shift.

22. The system of claim 21 wherein the measured motion in the first and second analysis windows are determined by the most significant sample estimate obtained by variable density bandwidth fusion and multiscale mean shift.

23. The system of claim 13 wherein the video sequence is received from a camera mounted to an ego vehicle.

24. The system of claim 13 wherein trajectory of motion is determined using vehicle speed of the ego vehicle and camera parameters.

* * * * *